United States Patent Office 3,539,555
Patented Nov. 10, 1970

3,539,555
DIBENZO[b,f][1,4]OXAZOCINES, DIBENZO[b,f][1,4]OXAZONINES AND THIO ANALOGS
Harry L. Yale and Jack Bernstein, New Brunswick, N.J., assignors to E. R. Squibb & Sons, Inc., New York, N.Y., a corporation of Delaware
No Drawing. Continuation-in-part of application Ser. No. 546,193, Apr. 29, 1966. This application Dec. 12, 1968, Ser. No. 783,428
Int. Cl. C07d 93/00, 87/00
U.S. Cl. 260—239.3        3 Claims

ABSTRACT OF THE DISCLOSURE

Compounds of the formula

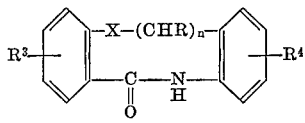

wherein $n$ is 1 or 2; X is selected from the group consisting of oxygen and sulfur; R is selected from the group consisting of hydrogen, lower alkyl, and monocyclic aryl; and $R^3$ and $R^4$ are each selected from the group consisting of hydrogen, halogen, lower alkyl, cyclo-lower alkyl, cyano, lower haloalkyl, lower alkoxy, lower alkylthio, lower alkylsulfinyl, lower alkylsulfonyl, lower haloalkoxy, lower haloalkythio, and amidosulfonyl. These compounds are useful intermediates in the preparation of the corresponding N-carboxamides which have utility as anticonvulsants and antiepileptics for the treatment of grand mal, petit mal, temporal lobe epilepsy, and trigeminal neuralgia.

---

This application is a continuation-in-part of our application Ser. No. 546,193, filed Apr. 29, 1966, now U.S. Pat. 3,452,046.

This invention relates to novel physiologically active substances of the formula (I)

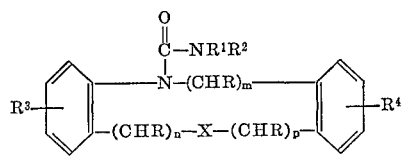

wherein R represents hydrogen, lower alkyl, or monocyclic aryl; $RR^1$ and $R^2$ may be the same or different and represent hydrogen, lower alkyl, and lower aralkyl; $NR^1R^2$ taken together is a heterocyclic radical having the formula

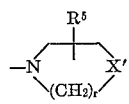

in which X' represents NH, O, or CH$_2$, $r$ represents 1, 2 or 3, and $R^5$ represents hydrogen, lower alkyl, lower alkoxy, hydroxy-lower alkyl, lower alkanoyloxy-lower alkyl, hydroxy-lower alkoxy-lower alkyl and di(lower alkyl) amino-lower alkoxy-lower alkyl. These may be exemplified by piperidyl [i.e., piperidino, 2-piperidyl, 3-piperidyl and 4-piperidyl]; (lower alkyl)piperidyl [e.g., 2,3 or 4-(lower alkyl)piperidino or 2,3 or 4-(N-lower alkyl)piperidyl]; or 2,3 or 4-(N-lower alkyl)-2,3 or 4-(lower alkyl)piperidyl; (lower alkoxy)piperidyl; pyrrolidyl; (lower alkyl)pyrrolidyl; (lower alkoxy)pyrrolidyl; piperazyl; (lower alkyl)piperazyl (e.g., $N^4$-methylpiperazino); di(lower alkyl)piperazyl; (lower alkoxy)piperazyl; (hydroxy-lower alkyl)piperazyl [e.g., $N^4$-(2-hydroxyethyl)piperazino]; (lower alkanoyl-oxyalkyl)piperazyl [e.g., N-(2-acetoxyethyl)piperazino]; (hydroxy-lower alkoxy-lower alkyl) piperazyl [e.g., $N^4$-(2-hydroxyethoxyethyl)piperazino]; di-(lower alkyl)amino-(lower alkoxy-lower alkyl)piperazyl [e.g., $N^4$-(2-dimethylaminoethoxyethyl)piperazino]; and homopiperazyl; $R^3$ and $R^4$ may be the same or different and represent hydrogen, halogen, lower alkyl, cyclo-lower alkyl, cyano, lower haloalkyl, lower alkoxy, lower alkylthio, lower alkylsulfinyl, lower alkylsulfonyl, lower haloalkoxy, lower haloalkylthio, or amidosulfonyl, N,N-di-lower alkylamidosulfonyl; X represents oxygen or sulfur; $m$ is or 1; $n$ is 0, 1 or 2; $p$ is 0, 1 or 2; and the sum of $m+n+p=1$ to 3, and salts thereof.

The terms "lower alkyl," "lower alkoxy," as employed herein, include both straight and branched chain radicals of less than eight carbon atoms. All four halogens are contemplated.

By monocyclic aryl radicals is meant phenyl and substituted phenyl radicals such as lower alkylphenyl, e.g., o-, m-, or p-tolyl, ethylphenyl; di-lower alkylphenyl, e.g., p-xylyl; lower alkoxyphenyl, e.g., methoxyphenyl; halophenyl, e.g., chlorophenyl, bromophenyl, etc.

As to the salts of the compounds of this invention, those coming within the purview of this invention include the acid-addition salts, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

Compounds of this invention are therapeutically active compounds which are utilizable as anticonvulsants and antiepileptics for the treatment of grand mal, petit mal, temporal lobe epilepsy, and trigeminal neuralgia. For these purposes, they may be administered orally or parenterally in such form as tablets, capsules, injectables, or the like by incorporating the appropriate dosage of the compound with carriers according to the pharmaceutical practices.

The dose for humans would be initially about 200 mg., administered two or three times daily. This level would be maintained for four to six days, and would then be increased to about 400 mg., two or three times daily, for complete therapeutic maintenance.

The compounds of Formula I may be produced by reacting a compound of the formula (II)

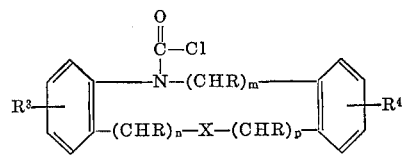

with ammonia or an amine, either in the absence or presence of solvents like benzene, toluene, or ethanol, at ambient or elevated temperatures, i.e., 20–150° C., in a sealed zone.

The carbonyl chlorides of Formula II, which are used as starting materials, are produced by reacting a compound of the formula (III)

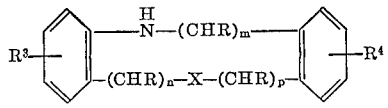

with phosgene in an inert solvent such as toluene or carbon tetrachloride.

The compounds of Formula III may be prepared through any of several processes, dependent upon the particular compound desired.

Compounds according to Formula III wherein X is sulfur, m equals 1, n equals 0, and p equals 1 are produced by reacting an α,α'-dihalo-o-xylene with an appropriately substituted o-aminobenzenethiol in a solvent such as acetic acid or N,N-dimethylformamide at elevated temperatures.

Compounds according to Formula III wherein X is oxygen, m equals 1, n equals 0, and p equals 1 are produced by reacting a lower alkyl o-(halomethyl)benzoate with an o-nitrophenol to give a lower alkyl o-(o-nitrophenoxymethyl)benzoate (IV), reducing (IV) by known means to a lower alkyl o-(o-aminophenoxymethyl)benzoate (V), saponifying (V) by known methods to an o-(o-aminophenozymethyl)benzoic acid (VI), cyclizing (VI) with a carbodiimide e.g., dicyclohexylcarbodiimide, to a dibenzo[b,f][1,4]oxazocin-11-one (VII), and, finally, reducing (VII) with lithium aluminum hydride or sodium borohydride to an 11,12-dihydrodibenz[b,f][1,4]oxazocine (VIII).

$R^3$ and $R^4$ are as hereinbefore defined:

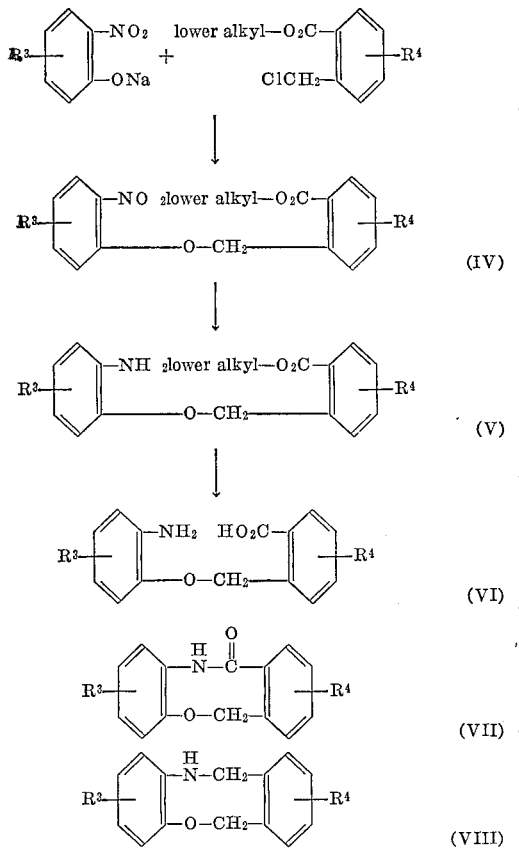

Among the suitable o-nitrophenols are halo-o-nitrophenols such as 3-bromo-2-nitrophenol, 4-bromo-2-nitrophenol, 5-bromo-2-nitrophenol, 3-chloro-2-nitrophenol, 4-chloro-2-nitrophenol, 5-chloro-2-nitrophenol, and 6-chloro-2-nitrophenol; lower alkyl-o-nitrophenols such as 3-nitro-o-cresol, 2-nitro-m-cresol, 4-nitro-m-cresol, and 3-nitro-p-cresol; cyano-o-nitrophenols such as 3-nitrosalicylonitrile and 3-nitro-4-hydroxybenzonitrile; lower alkoxy-o-nitrophenols such as 3-methoxy-6-nitrophenol and 3-methoxy-2-nitrophenol; and (trifluoromethyl)-o-nitrophenols such as 2-nitro-4-(trifluoromethyl)phenol.

Among the suitable lower alkyl o-(halomethyl)benzoates (prepared from the lower alkyl o-methylbenzoates by reaction with sulfuryl chloride) are lower alkyl o-(halomethyl)halobenzoates such as ethyl 6 - chloro-o-(chloromethyl)benzoate, methyl 5-chloro - o - (chloromethyl)benzoate, 3-chloro - o - (chloromethyl)benzoate, 5 - bromo-o-(chloromethyl)benzoate, and 4 - bromo-o-(chloromethyl)benzoate; lower alkyl cyano - o - (haloalkyl)benzoates such as methyl 6-cyano - o - (chloromethyl)benzoate (prepared via 6-chloro-o-toluic acid and cuprous cyanide, followed by esterification and chlorination).

Compounds according to Formula III wherein X is sulfur and m, n and p each equal 1 are produced by reacting an o-nitrobenzyl mercaptan with a lower alkyl o-(halomethyl)benzoate to give a lower alkyl o-(o-nitrobenzylthiomethylbenzoate) (IX); by a similar sequence of reactions as outlined above, namely, (a) reduction, (b) saponification, (c) cyclization, and (d) reduction, there is obtained (X), wherein $R^3$ and $R^4$ are as hereinbefore defined:

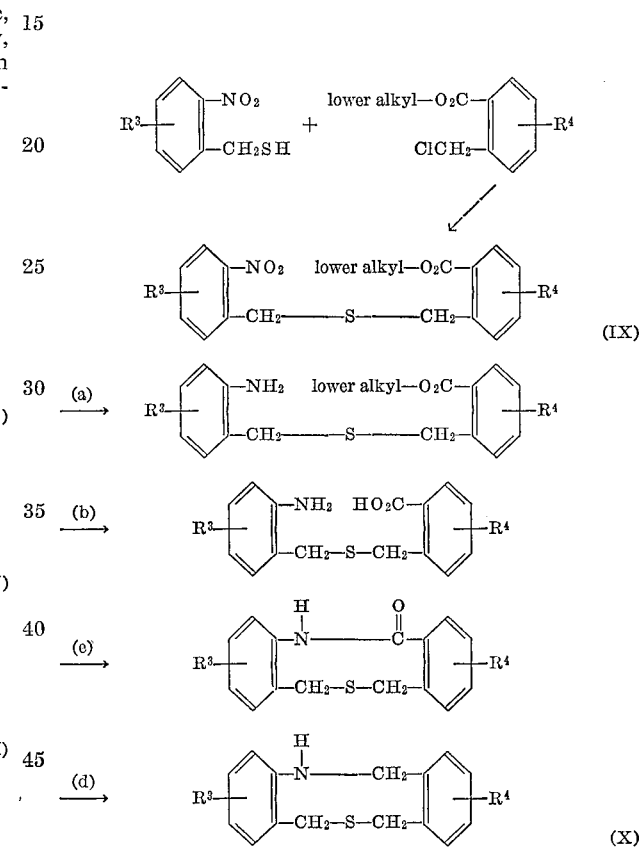

Among the suitable o-nitrobenzyl mercaptans are (trifluoromethyl)-o-nitrobenzyl mercaptans such as 4-(trifluoromethyl)-o-nitrobenzyl mercaptan (prepared by the sequence of reactions:

4-bromobenzotrifluoride→
4-(trifluoromethyl)-phenylmagnesium bromide→
4-(trifluoromethyl)toluene→
2-nitro-4-(trifluoromethyl)toluene→
2-nitro-4-(trifluoromethyl)benzyl bromide→
4-(trifluoromethyl)-o-nitrobenzyl mercaptan);

halo-o-nitrobenzyl mercaptans such as 3-chloro-o-nitrobenzyl mercaptan (prepared by the bromination of 3-chloro-o-nitrotoluene to 3-chloro-o-nitrobenzyl bromide and conversion, by known methods, to the mercaptan), 4-chloro - o - nitrobenzyl mercaptan (prepared from 4-chloro-o-nitrotoluene as described above), and 5-bromo-o-nitrobenzyl mercaptan (prepared as described above from 5-bromo-o-nitrotoluene).

Compounds according to Formula III where X is oxygen and m, n and p each equals 1 and $R^3$ and $R^4$ are as hereinbefore defined (XI) are produced as shown directly above but substituting o-nitrobenzyl alcohol for the o-nitrobenzyl mercaptan used in that synthesis.

(XI)
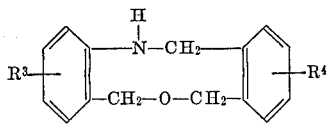

Among the suitable o-nitrobenzyl alcohols are (trifluoromethyl)-o-nitrobenzyl alcohols such as 4-(trifluoromethyl)-o-nitrobenzyl alcohol (prepared by the sequence of reactions:

2-nitro-4-(trifluoromethyl)toluene→
2-nitro-4-(trifluoromethyl)benzoic acid→
4-(trifluoromethyl)-o-nitrobenzyl alcohol);

halo-o-nitrobenzyl alcohols such as 4-chloro-o-nitrobenzyl alcohol (prepared by the sequence of reactions:

4-chloro-o-nitrotoluene→
4-chloro-o-nitrobenzoic acid→
4-chloro-o-nitrobenzyl alcohol);

and, 5-bromo-o-nitrobenzyl alcohol (prepared by the above sequence of reactions but substituting 5-bromo-o-nitrotoluene for the 4-chloro-o-nitroluene).

Compounds according to Formula III wherein X is oxygen or sulfur, $m$ equals 1, $n$ equals 0 and p equals 0 are prepared by a series of reactions as shown by the following equations, which for purposes of exemplification, are directed to the thio product and wherein R, $R^3$ and $R^4$ are as hereinbefore defined:

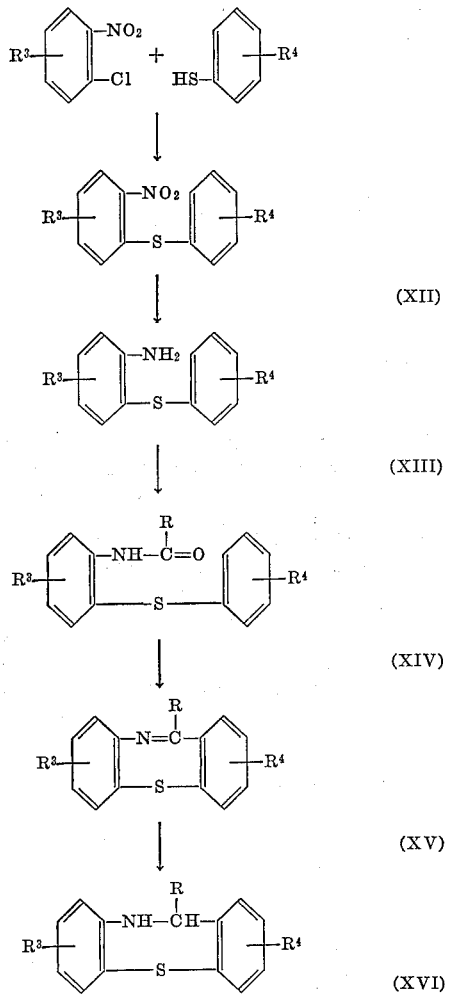

Among the suitable o-chloronitrobenzenes utilizable as initial reagents in these reactions may be mentioned: o-chloronitrobenzene; halo-o-chloronitrobenzenes, such as 2,5-dichloronitrobenzene, 2,4 - dichloronitrobenzene, 2-chloro-5-fluoronitrobenzene, and 2-chloro-4 - fluoronitrobenzene; (lower alkyl)-o-chloronitrobenzenes, such as 5-(lower alkyl)-2 - chloronitrobenzenes (e.g., 5-methyl-2-chloronitrobenzene, 5-ethyl-2-chloronitrobenzene, 5 - n-propyl-2-chloronitrobenzene, and 5-n-hexyl-2-chloronitrobenzene); and 4-(lower alkyl)-2 - chloronitrobenzenes; (lower alkyl) - 2 - chloronitrobenzenes (e.g., 5-methyl-2-alkoxy)-2-chloronitrobenzenes (e.g., 5-methoxy-2-chloronitrobenzene, 5 - ethoxy - 2 - chloronitrobenzene, 5-n-propoxy-2-chloronitrobenzene and 5-n-hexloxy-2-chloronitrobenzene); and (trifluoromethyl) - o - chloronitrobenzenes, such as 5-(trifluoromethyl) - 2 - chloronitrobenzene, and 4-(trifluoromethyl)-2 - chloronitrobenzene.

Among the suitable benzenethiols utilizable as initial reagents in these reactions may be mentioned: benzenethiol; halobenzenethiols, such as 2-chlorobenzenethiol, 4-chlorobenzenethiol, 2-fluorobenzenetiol, 4-fluorobenzenetiol, and 2 - bromobenzenethiol; (lower alkyl)benzenethiols, such as o-toluenethiol, p-toluenethiol, 2-ethylbenzenethiol, 4-n-propylbenzenethiol, and 4-n-hexylbenzenethiol; (lower alkoxy)benzenethiols, such as 2-methoxybenzenethiol, 4-methoxybenzenethiol, 4 - ethoxybenzenetiols, such as 2 - (trifluoromethyl)benzenethiol and 4-(trifluoromethyl)benzenethiol.

Should the corresponding oxy compounds be desired, phenolic starting materials may be substituted for the above benzenethiols.

Suitable phenols utilizable as initial reagents in these reactions may be mentioned: phenols; halophenols, such as 2-chlorophenol, 4-chlorophenol, 2 - fluorophenol, 4-fluorophenol, and 2-bromophenol; (lower alkyl)phenols such as o-cresol, p-cresol, 2-ethylphenol, 4 - n - propylphenol, and 4-n - hexylphenol; (lower alkoxy)phenols, such as 2-methoxyphenol; 4 - methoxypenol, 4 - etoxyphenol, and 4 - propoxyphenol; and (trifluoromethyl)-phenols, such as 2-(trifluoromethyl)phenol and 4-(trifluoromethyl)phenol.

In the initial reaction of this process, the o-chloronitrobenzene is reacted with the benzenethiol, the reaction preferably being conducted in the presence of a condensation agent such as (e.g., sodium hydroxide), whereby a corresponding 2-nitrophenyl phenyl sulfide (Compounds XII) is formed. The nitro group is then reduced to an amine by treatment with a reducing agent such as nascent hydrogen, which may be formed in situ by the action of an electropositive metal on an acid, thereby forming the corresponding 2-(phenylthio)aniline derivative (Compounds V).

If a final compound is desired which is unsubstituted in the 11-position, the 2-(phenylthio)aniline is then treated with formic acid whereby the corresponding 2-(penylthio)formanilide (Compound XIV, wherein R is hydrogen) is produced. If, however, an 11-substituted product is desired, the 2-(phenylthio)aniline is reacted with a lower alkanoyl halide or an aryl-carbonyl halide, whereby the corresponding acylated aniline derivative (Compound XIV, wherein R is alkyl or aryl) is formed. Among the suitable acyl halides utilizable in this step of the process may be mentioned lower alkanoyl chloride of at least two carbon atoms, as exemplified by acetyl chloride, propionyl chloride, butyryl chloride and hexanoyl chloride, and monocyclic aryl carbonyl chlorides, such as benzoyl chloride, o, m, and p-toluyl chloride, and o,p-dimethylbenzoyl chloride.

Compound XIV is then cyclized by treatment with a mixture of polyphosphoric acid and phosphorus oxychloride at an elevated temperature (preferably about 100° C. to about 140° C.) to yield the corresponding dibenzo [b,f][1,4]thiazepine derivatives (Compound XV). Compound XV is then reduced, as by treatment with a mixture of lithium aluminum hydride and aluminum chloride, to yield the corresponding 10,11-dihydrodibenzo[b,f][1,4]thiazepine derivatives (Compound XVI).

Compounds according to formula III wherein m is 0, n is 1 and p is 0 are prepared alternatively by either of two series of reactions as shown by the following equations, wherein R³ and R⁴ are as hereinbefore defined, and X' is chloro or bromo:

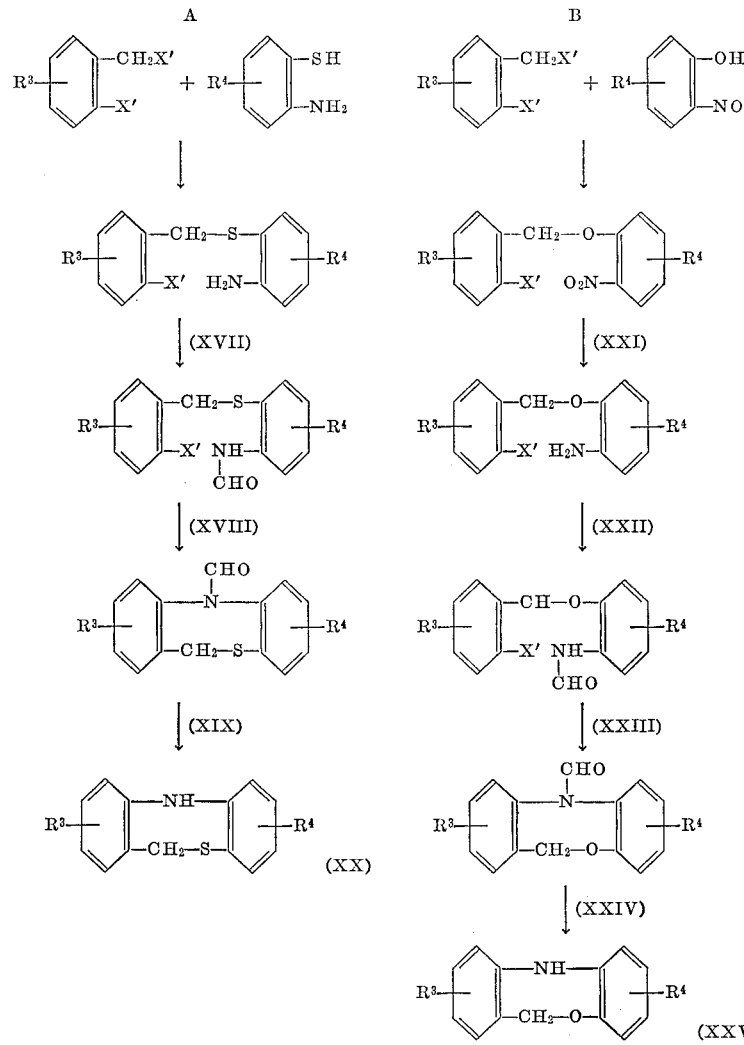

Among the suitable o-halobenzyl halides utilizable as initial reagents in reaction series A may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides, (e.g., 5-methyl-2-bromobenzyl chloride, 5-ethyl-2-bromobenzyl bromide, 5-n-propyl-2-bromobenzyl bromide, and 5-hexyl-2-chlorobenzyl chloride); and 4-(lower alkyl)-2-halobenzyl halides; (lower alkoxy)-o-halobenzyl halides, such as 5-(lower alkoxy)-2-halobenzyl halides (e.g., 5-methoxy-2-bromobenzyl bromide, 5-ethoxy-2-bromobenzyl chloride, 5-n-propoxy-2-bromobenzyl chloride, and 5-n-hexyloxy-2-chlorobenzyl chloride); (trifluoromethyl)-o-halobenzyl halides, such as 5-(trifluoromethy)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4-(trifluoromethylmercapto)-2-bromobenzyl bromide; (trifluoromethoxy)-o-halobenzyl halides, such as 5-(trifluoromethoxy)-2-bromobenzyl chloride and 4-(trifluoromethoxy)-2-bromobenzyl bromide; and (dimethylaminosulfonyl)-o-halobenzyl halides, such as 5-(dimethylaminosulfonyl)-2-bromobenzyl chloride and 4-(dimethylaminosulfonyl)-2-bromobenzyl bromide.

Among the suitable o-aminobenzenethiols utilizable as initial reagents in reaction series A may be mentioned: o-aminobenzenethiol; halo-o-aminobenzenethiols, such as 5-chloro-2-aminobenzenethiol, 4-chloro-2-aminobenzenethiol, 5-fluoro-2-aminobenzenethiol, 4-fluoro-2-aminobenzenethiol, and 5-bromo-2-aminobenzenethiol; (lower alkyl)-o-aminobenzenethiols, such as 5-(lower alkyl)-2-aminobenzenethiols (e.g., 5-methyl-2-aminobenzenethiol, 5-ethyl-2-aminobenzenethiol, 5-n-propyl-2-aminobenzenethiol, and 5-n-hexyl-2-aminobenzenethiol); and 4-(lower alkyl)-2-aminobenzenethiols; (lower alkoxy)-o-aminobenzenethiols, such as 5-(lower alkoxy)-o-aminobenzenethiols (e.g., 5-methoxy-2-aminobenzenethiol, 5-ethoxy-2-aminobenzenethiol, 5-n-propoxy-2-aminobenzenethiol, and 5-n-hexyloxy-2-aminobenzenethiol) and 4 - (lower alkoxy)-2-aminobenzenethiols); (trifluoromethyl)-o - amino- benzenethiols, such as 5-(trifluoromethyl)-1-aminobenzenethiol and 4 - (trifluoromethyl)-2-aminobenzenethiol; (trifluoromethoxy)-o-aminobenzenethiols, such as 5-(trifluoromethoxy) - 2 - aminobenzenethiol; (trifluoromethylmercapto)-o-aminobenzenethiols, such as 5 - (trifluoromethylmercapto)-2-aminobenzenethiol; and N,N-(dimethylaminosulfonyl)-o-aminobenzenethiols.

In the initial reaction of the process of reaction series A, the o-halobenzyl halide is reacted with an o-aminobenzenethiol, the reaction preferably being conducted in the presence of a condensation agent, such as a base (e.g., sodium ethoxide), whereby a corresponding o-halobenzyl-o-aminophenylthioether (Compound XVII) is formed.

The aniline derivate (Compound XVII) is then treated with formic acid whereby the corresponding 2-(o-halobenzylmercapto) formanilide derivative (Compound XVIII) is produced. Compound XVIII is then cyclized by treatment with a basic reagent (e.g., potassium carbonate or sodium carbonate) in a solvent (e.g., N,N-dimethylformamide, N,N-dimethylacetamide, or nitrobenzene) at an elevated temperature, whereby the corresponding 5-formyl-5,11-dihydrodibenzo[b,e][1,4]thiazepine derivative (Compound XIX) is formed. The formamide is then hydrolyzed, as by treatment with a base (e.g., sodium hydroxide) at an elevated temperature to yield the 5,11-dihydrodibenzo[b,e][1,4]thiazepine derivative (Compound XX).

Among the suitable o-halobenzyl halides utilizable as initial reagents in reaction series B may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides, (e.g., 5-methyl-2-bromobenzyl chloride, 5-ethyl-2-bromobenzyl bromide, 5-n-propyl-2-bromobenzyl bromide and 5-n-hexyl-2-chlorobenzyl chloride) and 4-(lower alkyl)-2-halobenzyl halides; (lower alkoxy)-o-halobenzyl halides, such as 5-(lower alkoxy)-2-halobenzyl halides (e.g., 5-methoxy-2-bromobenzyl bromide, 5-ethoxy-2-bromobenzyl chloride, 5-n-propoxy-2-bromobenzyl chloride, and 5-n-hexyloxy-2-chlorobenzyl chloride); (trifluoromethyl)-o-halobenzyl halides, such as 5-(trifluoromethyl)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4 - (trifluoromethylmercapto) - 2 - bromobenzyl bromide; (trifluoromethoxy)-o-halobenzyl halides, such as 5-(trifluoromethoxy)-2-bromobenzyl chloride and 4-(trifluoromethoxy)-2-bromobenzyl bromide; and (N,N-dimethylsulfonamido)-o-halobenzyl halides, such as 5-(N,N-dimethylsulfonamido)-2-bromobenzyl chloride and 4-(N,N-dimethylsulfonamido)-2-bromobenzyl bromide.

Among the suitable o-nitrophenols utilizable as initial reagents in reaction series B may be mentioned: o-nitrophenol; halo-o-nitrophenols, such as 5-chloro-2-nitrophenol, 4-chloro-2-nitrophenol, 5-fluoro-2-nitrophenol, 4-fluoro-2-nitrophenol, and 5-bromo-2-nitrophenol; (lower alkyl)-o-nitrophenols, such as 5-(lower alkyl)-2-nitro phenols (e.g., 5-methyl-2-nitrophenol, 5-ethyl-2-nitrophenol, 5-n-propyl-2-nitrophenol and 5-n-hexyl-2-nitrophenol) and 4-(lower alkyl)-2-nitrophenols; (lower alkoxy)-o-nitrophenols, such as 5-(lower alkoxy)-2-nitrophenols (e.g., 5-methoxy-2-nitrophenol, 5-ethoxy-2-nitrophenol, 5-n-propoxy-2-nitrophenol and 5-n-hexyloxy-2-nitrophenol), and 4-(lower alkoxy)-2-nitrophenols; (trifluoromethyl)-o-nitrophenols, such as 5-(trifluoromethyl)-2-nitrophenol and 4-(trifluoromethyl)-2-nitrophenol; (trifluoromethoxy)-o-nitrophenols, such as 5-(trifluoromethoxy)-2-nitrophenol; (trifluoromethylmercapto)-o-nitrophenols, such as 5-(trifluoromethylmercapto)-2-nitrophenols; and N,N-dimethylsulfonamido-o-nitrophenols.

In the initial reaction of the process of reaction series B, the o-halobenzyl halide is reacted with an o-nitrophenol, the reaction preferably being conducted in the presence of a condensation agent, such as a base (e.g., sodium hydroxide), whereby a corresponding o-halobenzyl-o-nitrophenyl ether (Compounds XXI) is formed. The nitro group is then reduced to an amine by treatment with a reducing agent such as nascent hydrogen, which may be found in situ by the action of an electropositive metal on an acid, thereby forming the corresponding 2-(o-halobenzyloxy)-aniline derivative (Compound XXII).

The aniline derivative (Compound XXII) is then treated with formic acid whereby the corresponding 2-(o-halobenzyloxy)formanilide derivative (Compound XXIII) is produced. Compound XXIII is then cyclized by treatment with a basic reagent (e.g., potassium carbonate or sodium carbonate) in a solvent (e.g., N,N-dimethyl-formamide, N,N-dimethylacetamide, or nitrobenzene) at an elevated temperature, whereby the corresponding 5-formyl-5,11-dihydrodibenz[b,e][1,4]oxazepine derivative (Compound XXIV) is formed. The formamide is then hydrolyzed, as by treatment with a base (e.g., sodium hydroxide) at an elevated temperature to yield the 5,11-dihydrodibenz[b,e][1,4]oxazepine derivative (Compound XXV).

Reaction series A and B may be employed interchangeably in the preparation of the thio or oxy compounds. However, as illustrated, it is preferable to employ reaction series A in the preparation of the thio compounds and reaction series B in the preparation of the oxy compounds.

Compounds according to Formula III wherein $n$ is 2 and $m$ and $p$ are each 0 may be prepared by the reaction sequences A and B set forth above, substituting an o-halophenethyl halide for the o-halobenzyl halide employed therein.

The compounds according to Formula III wherein X is oxygen, $m$ is 1, $n$ is 2 and $p$ is 0 are prepared by a series of reactions shown by the following equations:

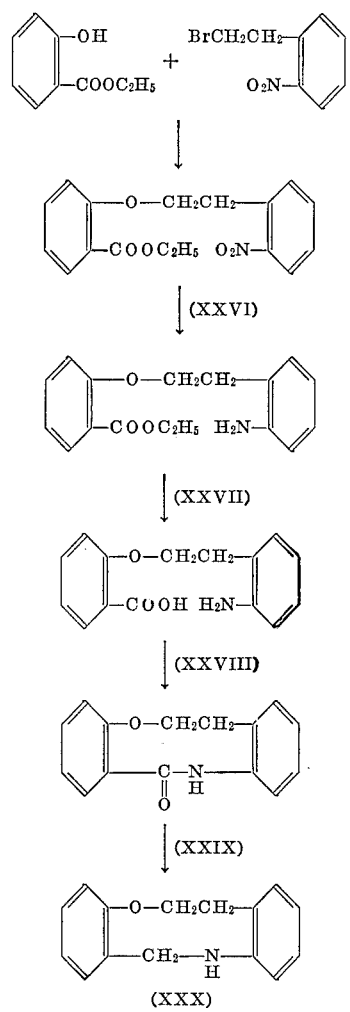

In the initial reaction, a lower alkyl ester of salicylic acid is treated with a 2-nitrophenethyl halide under alkaline conditions. The 2-(2-nitrophenethoxy)benzoic acid ester thus obtained (Compounds XXVI) is reduced to the corresponding amino derivative (Compound XXVII) by catalytic reduction or other standard reduction methods, and the ester hydrolyzed with dilute aqueous alkali to yield the desired 2-(2-aminophenethoxy)benzoic acid (Compound XXVIII). This acid is then ring-closed by treatment with dicyclohexylcarbodiimide to yield a dibenz[b,f][1,5]oxazonin-6-one (Compound XXIX) which is reduced by treatment with lithium aluminum hydride to a dibenz[b,f][1,5]oxazonine (Compound XXX).

The compounds of Formula III in which X is sulfur, $m$ is 1, $n$ is 2 and $p$ is 0, are obtained by treating a lower alkyl ester of 2-mercaptobenzoic acid with a 2-nitrophenethyl halide under alkaline conditions and the 2-(2-nitrophenethylmercapto)benzoic acid ester carried through the series of reactions outlined above for the preparation of the corresponding oxygen analog.

The compounds according to Formula III wherein X is oxygen, $m$ is 0, $n$ is 1 and $p$ is 2 are prepared by a series of reactions shown by the following equations:

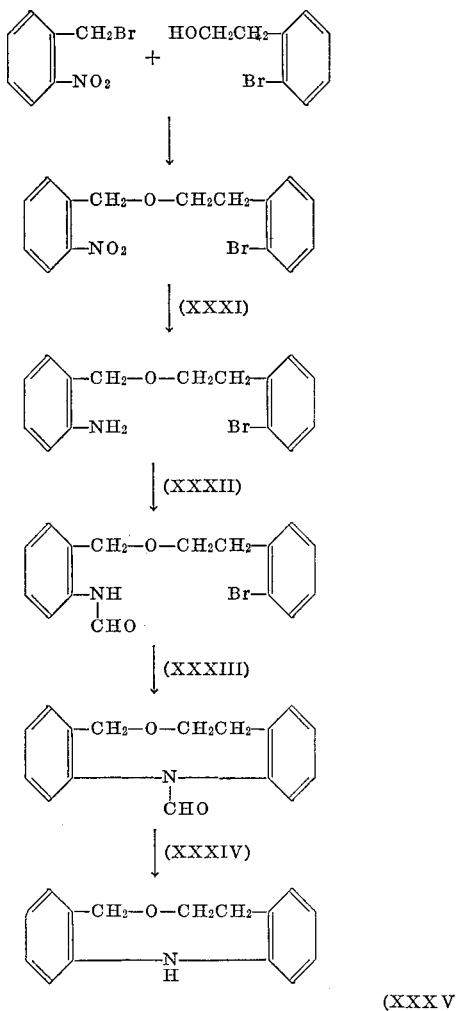

In the initial reaction, a 2-nitrobenzyl bromide is treated with a 2-bromophenethanol under alkaline conditions to obtain a 2-bromophenethyl 2-nitrobenzyl ether (Compounds XXXI). This ether is then reduced using catalytic hydrogenation, or other standard methods for reduction of aromatic nitro groups, to the correspondingly substituted 2-(2-bromophenethoxymethyl) aniline (Compound XXXII). Treatment of this analine with a mixture of formic and acetic acids yields the desired formanilide (Compound XXXIII) which is then ring-closed to (Compound XXXIV) by treatment with anhydrous potassium carbonate in dimethylformanilide containing copper powder as a catalyst for the reaction. Hydrolysis of Compound XXXIV with aqueous alkali yields the desired dibenz[c,f][1,5]oxazonine (Compound XXXV).

The compounds of Formula III in which X is sulfur, $m$ is 0, $n$ is 1 and $p$ is 2, the sum of $m$, $n$ and $p$ being 3, are obtained by treating a 2-bromophenethyl mercaptan with a 2-nitrobenzyl bromide to obtain a 2-bromophenethyl 2-nitrophenyl sulfide and carrying out the series of reactions outlined above for the corresponding oxygen analog.

EXAMPLE 1

2-chloro-11,12-dihydro-6H-dibenzo[b,f][1,4]thiazocine-12-carboxamide (a) Under nitrogen, a solution of 5 g. of sodium hydroxide in 250 ml. of water is added to a stirred suspension of 25.5 g. of 2-amino-4-chlorobenzenethiol hydrochloride in 800 ml. of hexane. The base is dissolved in the hexane; the hexane is filtered, dried under nitrogen, and the hexane is removed via a flash evaporator to give 14.2 g. of 2-amino-4-chlorobenzenethiol, M.P. about 44–46°.

(b) A solution of 21 g. of α,α′-dibromo-o-xylene in 300 ml. of dry dimethylformamide is stirred at 95° under nitrogen. To this at 95–105° is added 13 g. of 2-amino-4-chlorobenzenethiol in 250 ml. of dimethylformamide for 15 minutes. After the addition, stirring is continued at 100–105° for one hour. The dimethylformamide is removed and the residue recrystallized from ethanol to give 2 - chloro - 11,12 - dihydro - 6H - dibenzo[b,f][1,4] - thiazocine hydrobromide, M.P. about 210–212° (dec.).

(c) A solution of 4.0 g. of 85% potassium hydroxide in 40 ml. of water is added to a stirred suspension of 15 g. of the hydrobromide in 200 ml. of ether. The base extracts into the ether. The ether is washed, dried, concentrated, and the residue is recrystallized from cyclohexane to give 2-chloro-11,12-dihydro-6H-dibenzo[b,f][1,4]thiazocine.

(d) At 10–15°, a solution of 4.0 g. of phosgene in 30 ml. of toluene is added during 20 minutes to a stirred solution of 5.3 g. of 2-chloro-11,12-dihydro-6H-dibenzo[b,f][1,4]thiazocine and 4.0 g. of triethylamine in 175 ml. of toluene. After the addition, stirring is continued for two hours. The reaction mixture is filtered, the filtrate is concentrated, and the residue taken up in ether. The filtered ether solution is again concentrated to give 2-chloro - 11,12 - dihydro - 6H - dibenzo[b,f][1,4]thiazocine-12-carbonyl chloride.

(e) 2 - chloro - 11,12 - dihydro - 6H - dibenzo[b,f][1,4]thiazocine-12-carbonyl chloride, 3.6 g., and 50 ml. of 3.2 N ethanolic ammonia are heated at 120–125° for 30 hours. After cooling, the reaction is concentrated to dryness, the solid is washed with water, dried, and recrystallized from acetonitrile to give 7-chloro-11,12-dihydro - 6H - dibenzo[b,f][1,4]thiazocine - 12 - carboxamide, M.P. about 223–225° (dec.).

EXAMPLE 2

N,N-dimethyl-2-chloro-11,12-dihydro-6H-dibenzo[b,f][1,4]thiazocine-12-carboxamide By substituting 50 ml. of 4.7 N ethanolic dimethylamine for the ethanolic ammonia in Example 1, there is obtained N,N - dimethyl - 2 - chloro - 11,12 - dihydro - 6H-dibenzo[b,f][1,4]thiazocine-12-carboxamide.

EXAMPLE 3

N-(2-propyl)-2-chloro-11,12-dihydro-6H-dibenzo[b,f][1,4]thiazocine-12-carboxamide By substituting 50 ml. of 5.2 N ethanolic 2-propylamine for the ethanolic ammonia in Example 1, there is obtained N - (2 - propyl) - 2 - chloro - 11,12 - dihydro - 6H-dibenzo[b,f][1,4]thiazocine-12-carboxamide.

EXAMPLE 4

2-bromo-12-[1-(4-methylpiperazinyl)carbonyl]-11,12-dihydro-6H-dibenzo[b,f][1,4]thiazocine (a) By substituting 16.6 g. of 2-amino-4-bromobenzenethiol for the 2-amino-4-chlorobenzenethiol in Example 1(b), there is obtained 2-bromo-11,12-dihydro-6H-dibenzo[b,f][1,4]thiazocine.

(b) By substituting 6.2 g. of the product from (a) for the 2 - chloro - 10,11 - dihydro - 6H - dibenzo[b,f][1,4]thiazocine in Example 1(d), there is obtained 2-bromo-11,12 - dihydro - 6H - dibenzo[b,f][1,4]thiazocine - 12 - carbonyl chloride.

(c) By substituting 4.1 g. of the product from (b) for the 2 - chloro - 10,11 - dihydro - 6H - dibenzo[b,f][1,4]thiazocine-12-carbonyl chloride and 2.2 g. of N-methylpiperazine in 50 ml. absolute ethanol for the ethanolic ammonia in Example 1(e), there is obtained 2-bromo-12-[1 - (4 - methylpiperazinyl)carbonyl] - 11,12 - dihydro - 6H-dibenzo[b,f][1,4]thiazocine.

EXAMPLE 5

N,N-dibenzyl-2-bromo-11,12-dihydro-6H-dibenzo[b,f][1,4]thiazocine-12-carboxamide By substituting 4.35 g. of N,N-dibenzylamine for the N-methylpiperazine in Example 4(c), there is obtained N,N-dibenzyl - 2 - bromo - 11,12 - dihydro - 6H - dibenzo[b,f][1,4]thiazocine-12-carboxamide.

EXAMPLE 6

2-bromo-12-[1-(4-methylhomopiperazinyl)carbonyl]-11,12-dihydro-6H-dibenzo[b,f][1,4]thiazocine By substituting 2.51 g. of 4-methylhomopiperazine for the N-methylpiperazine in Example [4(c), there is obtained 2-bromo - 12 - [1 - (4 - methylhomopiperazinyl)carbonyl]-11,12-dihydro - 6H - dibenzo[b,f][1,4]thiazocine. This product, in 10 volumes of anhydrous ether, is cooled and treated with one equivalent of hydrogen chloride in anhydrous ether to give a precipitate of the hydrochloride. This is filtered and recrystallized from acetonitrile to give the pure product.

EXAMPLE 7

11,12-dihydro-6H-dibenzo[b,f][1,4]thiazocine-12-carboxamide (a) To a solution of 13.2 g. of α,α'-dibromo - o - xylene in 250 ml. of dimethylformamide at 100° under nitrogen is added dropwise a solution of 6.2 g. of o-aminobenzenethiol in 150 ml. of dimethylformamide. Following the addition, the reaction mixture is stirred for an additional 0.5 hour at 90–95°, and the dimethylformamide is removed to give 11,12-dihydro - 6H - dibenzo[b,f][1,4]thiazocine hydrobromide.

(b) To 10 g. of 85% potassium hydroxide in 250 ml. of water is added at 100°, 20 g. of the above hydrobromide salt. The mixture is stirred at 100° until the solid in suspension is converted to an oil. After cooling, the oil is extracted into ether, the ether solution is washed, dried and concentrated to give 14.5 g. of 11,12-dihydro-6H-dibenzo[b,f][1,4]thiazocine, M.P. about 102–104° after recrystallization from cyclohexane.

(c) To 5.7 g. of the product from (b), 5 g. of triethylamine and 75 ml. of anhydrous toluene at 5° is added a solution of 5 g. of phosgene in 36 ml. of toluene at 5–10°. After the addition, stirring is continued at room temperature for 2 hours. The reaction mixture is filtered, the filtrate is concentrated and the residue is recrystallized from cyclohexane to give 11,12 - dihydro-6H-dibenzo[b,f][1,4]thiazocine, M.P. about 144–145°.

(d) A suspension of 3.5 g. of the product from (c) in 50 ml. of 3.2 N alcoholic ammonia is heated at 110–120° for 20 hours in a sealed tube. After cooling the solid is filtered. The filtrate is concentrated and the residue is combined with the above solid, washed with water, and recrystallized from acetonitrile to give 11,12-dihydro-6H-dibenzo[b,f][1,4]thiazocine - 12 - carboxamide, M.P. about 213–215°.

EXAMPLE 8

2-propyl-11,12-dihydro-6H-dibenzo[b,f][1,4]-thiazocine-12-carboxamide

By replacing the o-aminobenzenethiol with o-amino-p-propylbenzenethiol (prepared by the reaction sequence: p-propylaniline→ 2-amino - 5 - propylsulfonyl chloride→ o-amino-p-propylbenzenethiol), there is obtained, by following the procedure of Example 7, 2-propyl - 11,12 - dihydro-6H-dibenzo[b,f][1,4]thiazocine-12-carboxamide.

EXAMPLE 9

11,12-dihydro-2-(trifluoromethyl)-6H-dibenzo[b,f][1,4]thiazocine-12-carboxamide (a) A solution of 4 g. of phosgene in 30 ml. of toluene is added over a period of 20 minutes to a stirred, ice cooled solution of 5.9 g. of 11,12 - dihydro-2-(trifluoromethyl) - 6H - dibenzo[b,f][1,4]thiazocine and 4 g. of triethylamine in 175 ml. of anhydrous toluene at 5–10°. After the addition, stirring is continued at room temperature for 2 hours. The mixture is filtered, the filtrate is concentrated and the residue taken up in ether. The filtered ether solution is concentrated to give 6 g. of 11,12 - dihydro - 2 - (trifluoromethyl)-6H-dibenzo[b,f][1,4]thiazocine-12-carbonyl chloride, M.P. about 157–159° after recrystallization from cyclohexane.

(b) A suspension of 3.6 g. of the product from (a) in 50 ml. of 3.2 N ethanolic ammonia is heated at 120–125° in a sealed tube for 30 hours. After cooling, the solid is filtered. An additional 2 g. of solid is recovered from the filtrate. The solid is washed with water, dried, and recrystallized from acetonitrile to give 2.1 g. of 11,12-dihydro - 2 - (trifluoromethyl) - 6H - dibenzo[b,f][1,4]thiazocine-12-carboxamide, M.P. about 253–255°.

EXAMPLE 10

5,11-dihydrodibenzo[b,e][1,4]thiazepine-5-carboxamide

A solution containing 8.2 g. of 5,11-dihydrodibenzo[b,e][1,4]thiazepine, 2.8 g. of dry pyridine and 80 ml. of dry toluene is cooled to −10° and treated dropwise with 47 ml. of a 15% solution of phosgene in dry toluene. Subsequently, the reaction mixture is kept 2 hours at −10°, 4 hours at 0°, and then allowed to warm to room temperature overnight. The toluene solution is decanted, cooled, mixed with 120 ml. of 2.9 N ethanolic ammonia, sealed into tubes, and heated 18 hours at 100°. The cooled tubes are opened, the ethanol-toluene solution is decanted, and concentrated to dryness in vacuo. The residue is heated to boiling with 100 ml. of benzene and the benzene solution poured on a column of activated alumina. Elution of the column first with benzene and then with 2-propanol gives a solid product. This solid is again chromatographed on alumina and the column is eluted first with benzene and finally with 2-propanol to give 5,11 - dihydrodibenzo[b,e][1,4]thiazepine - 5 - carboxamide, M.P. about 215–217°.

EXAMPLE 11

5,11-dihydrodibenz[b,e][1,4]oxazepine-5-carboxamide

By substituting 8.2 g. of 5,11 - dihydrodibenz[b,e][1,4]oxazepine for the 5,11-dihydrodibenzo[b,e][1,4]thiazepine in Example 10, there is obtained 5,11-dihydrodibenz[b,e][1,4]oxazepine - 5 - carboxamide, M.P. about 201–203°.

EXAMPLE 12

7-propoxy-5,11-dihydrodibenz[b,e][1,4]oxazepine-5-carboxamide

By replacing the 5,11 - dihydrodibenz[b,e][1,4]oxazepine with 7-propoxy - 5,11 - dihydrodibenz[b,e][1,4]oxazepine, there is obtained by a similar procedure, 7-propoxy - 5,11 - dihydrodibenz[b,e][1,4]oxazepine - 5 - carboxamide.

The 7 - propoxy - 5,11-dihydrodibenz[b,e][1,4]oxazepine is prepared from 4-propoxyphenol, by nitration, to a 4-propoxy - o - nitrophenol. The latter compound, by the procedure of J. Med. Chem. 7, 609 (1964) gives 7-propoxy-5,11-dihydrodibenz[b,e][1,4]oxazepine.

EXAMPLE 13

7-chloro-5,11-dihydrodibenz[b,e][1,4]oxazepine-5-carboxamide

By substituting 8.2 g. of 7-chloro-5,11-dihydrodibenz[b,e][1,4]oxazepine for the 5,11 - dihydrodibenzothiazepine in Example 10, there is obtained 7-chloro-5,11-dihydrodibenz[b,e][1,4]oxazepine - 5-carboxamide, M.P. about 191–193°.

EXAMPLE 14

8-chloro-10,11-dihydrodibenzo[b,f][1,4]thiazepine-10-carboxamide

A mixture of 5.9 g. of 8-chloro-10,11-dihydrodibenzo[b,f][1,4]thiazepine-10-carbonyl chloride and 50 ml. of 3.2 N ethanolic ammonia is heated for 18 hours. The cooled tube is opened and the contents filtered. The filtrate on standing at room temperature begins to deposit a crystalline solid; this is cooled and filtered to give 3.85 g. of material, M.P. about 179–181°. The 3.85 g. is recrystallized from 2-propanol to give 3.2 g. of 8-chloro-10,11-dihydrodibenzo[b,f][1,4]thiazepine - 10 - carboxamide, M.P. about 180–182°.

EXAMPLE 15

N,N-diethyl-11-phenyl-5,11-dihydrodibenzo[b,e][1,4]thiazepine-5-carboxamide

By substituting 8.5 g. of 11-phenyl-5,11-dihydrodibenzo[b,e][1,4]thiazepine for the 5,11-dihydrodibenzo[b,e][1,4]thiazepine and 120 ml. of 3.1 N ethanolic diethylamine for the ethanolic ammonia in Example 10, there is obtained N,N-diethyl-11-phenyl-5,11-dihydrodibenzo[b,e][1,4]thiazepine-5-carboxamide.

EXAMPLE 16

5-(1-piperidylcarbonyl)-10,12-dihydro-5H-dibenz[c,f][1,5]oxazocine (a) To 4.2 g. of 50% NaOH in 195 ml. of anhydrous ether, under nitrogen, is added 13.0 g. of o-nitrobenzyl alcohol in 260 ml. of anhydrous ether. To this suspension at 0° is added 21.6 g. o-bromobenzyl bromide in 40 ml. of anhydrous dimethyl formamide. The mixture is allowed to warm to room temperature spontaneously and after 4 hours, treated with water. The mixture is worked up to give 11.5 g. of o-bromobenzyl-o-nitrobenzyl ether, M.P. about 99.5–101.0°.

(b) To the product from (a), 4.5 g. in 100 ml. of 95% ethanol at 70° is added in one portion, a slurry of 20.0 g. of FeSO$_4$·2H$_2$O in 300 ml. of a 1:1 mixture of concentrated (28–30%; sp. gr. 0.9) ammonium hydroxide and water. Subsequently, the mixture is refluxed for 5.5 hours and filtered hot. From the filtrate, there is obtained 3.35 g. of o-[o-bromobenzyloxymethyl]-aniline, M.P. about 55.5–56.5°.

(c) The product from (b), 32 g. and 300 ml. of 98–100% formic acid are refluxed for 5 hours and then concentrated to dryness in vacuo to give o-[o-bromobenzyloxymethyl]formanilide.

(d) To 2.0 g. of copper bronze, 24.5 g. of micronized anhydrous K$_2$CO$_3$ and 30 ml. of anhydrous dimethyl formamide, under reflux, is added slowly a solution of 32.0 g. of the product from (c) in 300 ml. of anhydrous dimethyl formamide. The mixture is refluxed for 1 hour, an additional 10 g. of micronized anhydrous K$_2$CO$_3$ is added, the reflux continued for 2 additional hours, and the hot mixture is filtered. The filtrate is concentrated to dryness in vacuo; the residue, 50 cc. 25% aqueous NaOH and 300 ml. of 95% ethanol, are refluxed for 1 hour and again concentrated to dryness in vacuo. From the residue there is isolated 10,12-dihydro-5H-dibenz[c,f][1,5]oxazocine.

(e) By substituting 8.7 g. of the product from (d) for the 5,11-dihydrodibenzo[b,e][1,4]thiazepine, 8.5 g. of piperidine and 50 ml. of absolute ethanol for the ethanolic ammonia in Example 10, there is obtained 5-(1-piperidylcarbonyl)-10,12-dihydro-5H - dibenz[c,f][1,5]oxazocine. Purification of this material is effected by recrystallization from petroleum ether.

EXAMPLE 17

5-{1-[4-(2-hydroxyethyl)piperazinyl]carbonyl}-10,12-dihydro-5H-dibenzo[c,f][1,5]thiazocine (a) By substituting 14.3 g. of o-nitrobenzyl mercaptan for the o-nitrobenzyl alcohol in Example 16(a) and then following the procedures of Example 16(b), (c), and (d), there is obtained 10,12-dihydro-5H-dibenzo[c,f][1,5]thiazocine.

(b) By substituting 9.0 g. of the product from Example 16(d) for the 10,12-dihydro-5H-dibenz[c,f][1,4]-oxazocine, 13.0 g. of 2-hydroxyethylpiperazine and 50 ml. of absolute ethanol for the ethanolic ammonia in Example 10, there is obtained 5-{1-[4-(2-hydroxyethyl)piperazinyl]carbonyl}-10,12-dihydro - 5H - dibenzo[c,f][1,5]thiazocine.

EXAMPLE 18

12-(1-pyrrolidylcarbonyl)-11,12-dihydro-6H-dibenzo[b,f][1,4]thiazocine

By substituting 7.1 g. of pyrrolidine and 50 ml. of absolute ethanol for the alcoholic ammonia in Example 7(d), there is obtained 12-(1-pyrrolidylcarbonyl)-11,12-dihydro-6H-dibenzo[b,f][1,4]thiazocine.

EXAMPLE 19

12-(4-morpholinylcarbonyl)-11,12-dihydro-6H-dibenzo[b,f][1,4]thiazocine

By substituting 8.7 g. of morpholine and 50 ml. of absolute ethanol for the alcoholic ammonia in Example 7(d), there is obtained 12-(4-morpholinylcarbonyl)-11,12-dihydro-6H-dibenzo[b,f][1,4]thiazocine.

EXAMPLE 20

N-methyl-3-bromo-7-propoxy-5,11-dihydrodibenz[b,e][1,4]oxazepine-5-carboxamide (a) Employing the procedure of J. Med. Chem. 7, 609 (1964) with 2,4-dibromobenzyl bromide and 4-propoxy-o-nitrophenol, there is obtained 3-bromo-7-propoxy-5,11-dihydrodibenz[b,e][1,4]oxazepine.

(b) By substituting 6.68 g. of the product from (a) for the 2-chloro - 11,12 - dihydro-6H-dibenzo[b,f][1,4]thiazocine in Example 1(d), there is obtained 3-bromo-7 - propoxy - 5,11-dihydrodibenz[b,e][1,4]oxazepine - 5 - carbonyl chloride.

(c) By substituting 4.3 g. of the product from (b) for the 2-chloro-11,12-dihydro-6H-dibenzo[b,f][1,4]thiazocine and 50 ml. of 3.2 N ethanolic methylamine for the ethanolic ammonia in Example 1(e), there is obtained N-methyl-3-bromo - 7 - propoxy - 5,11 - dihydrodibenz[b,e][1,4]oxazepine-5-carboxamide.

EXAMPLE 21

5,6,12,13-tetrahydrodibenz[b,f][1,5]oxazonine-5-carboxamide (a) To a solution of 2.3 g. of sodium in 250 ml. of anhydrous ethanol is added 16.6 g. of ethyl salicylate. A solution of 23.0 g. of 2-nitrophenethyl bromide in 250 ml. of anhydrous ethanol is added dropwise with vigorous stirring. After the addition is completed, the reaction mixture is heated to gentle reflux, with stirring, until the reaction mixture is no longer alkaline. The mixture is concentrated in vacuo to remove the alcohol and the residue is extracted into ether. The ether extract is washed with water, dried, and concentrated to yield ethyl 2-(o-nitrophenethoxy)benzoate.

(b) To a solution of 5 g. of the product from (a) in 200 ml. of ethanol, is added 0.5 g. of 10% palladium on carbon catalyst and the mixture shaken with hydrogen at 50 p.s.i. until the theoretical quantity of hydrogen has reacted. The mixture is filtered and the ethanol removed in vacuo to yield ethyl 2-(o-aminophenethoxy)benzoate. The product is dissolved in anhydrous ether, treated with an ethereal solution of hydrogen chloride and the precipitated hydrochloride is obtained by filtration. It is recrystallized from an alcohol-ether mixture. An aqueous solution of the hydrochloride is treated with sodium bicarbonate and the liberated base is extracted into ether. The ether solution is dried and concentrated to yield ethyl 2-(o-aminophenethoxy)benzoate.

(c) A mixture of 14.3 g. of the product from (b), 10 g. of sodium hydroxide and 250 ml. of 50% aqueous alcohol is refluxed for 4 hours. The alcohol is distilled, the aqueous residue cooled, and extracted with ether. The aqueous solution is neutralized with 10% hydrochloric acid and the precipitated 2-(o-aminophenethoxy)benzoic acid is filtered, air-dried and recrystallized from aqueous alcohol.

(d) To a mixture of 15.3 g. of the product from (c) in 750 ml. of anhydrous ethyl acetate is added a solution of 12.3 g. of dicyclohexylcarbodiimide in 250 ml. of ethyl acetate. The reaction mixture is stirred vigorously, under nitrogen, for 36 hours and is then filtered.

The filtrate is concentrated in vacuo, the residue triturated with a small amount of cold ethyl acetate, and filtered. The 12,13 - dihydrodibenz[b,f][1,5]oxazonine (5H)-one thus obtained may be crystallized from acetonitrile.

(e) To a solution of 1.6 g. of lithium aluminum hydride and 500 ml. of anhydrous ether is added a solution of 2.3 g. of the product from (d) in 1,000 ml. of anhydrous ether. The reaction mixture is allowed to stir at room temperature for 24 hours. To the reaction mixture is added dropwise with vigorous stirring 6 ml. of water, followed by 5 ml. of 10% aqueous sodium hydroxide. The reaction mixture is filtered and the filtrate dried, concentrated, and the residue recrystallized from hexane to yield 5,6,12,13-tetrahydrodibenz[b,f][1,5]oxazonine.

(f) A solution of 4 g. of phosgene in 30 ml. of toluene is added dropwise, with vigorous stirring, to a cooled solution of 4.5 g. of the product from (e) and 4 g. of triethylamine in 175 ml. of anhydrous toluene. After the addition is complete, the reaction mixture is stirred for 2 hours at room temperature and filtered. The filtrate is concentrated in vacuo, the residue is extracted into ether, the ether solution is filtered, and the filtrate is concentrated to give 5,6,12,13-tetrahydrodibenz[b,f][1,5]oxazonine-5-carbonyl chloride.

(g) A mixture of 2.9 g. of the product from (f) and 50 ml. of a 3.2 N ethanolic ammonia solution is heated in a sealed tube at 125° for 30 hours. The contents of the cooled tube are concentrated, the residue suspended in 100 ml. of water, filtered, and the solid crystallized from acetonitrile to yield 5,6,12,13-tetrahydrodibenz[b,f][1,5]oxazonine-5-carboxamide.

EXAMPLE 22

5,6,12,13-tetrahydrodibenz[b,f][1,5]thiazonine-5-carboxamide

Following the procedure of Example 21, but substituting an equivalent amount of methyl o-mercaptobenzoate for the ethyl salicylate, there is obtained 5,6,12,13-tetrahydrodibenz[b,f][1,5]thiazonine-5-carboxamide.

EXAMPLE 23

5,10,12,13-tetrahydrodibenz[c,f][1,5]oxazonine-5-carboxamide (a) To a solution of 20.1 g. of o-bromophenethyl alcohol in 200 ml. of anhydrous toluene is added 4 g. of sodamide and the mixture stirred vigorously with gentle warming until the evolution of ammonia is essentially complete. To the cooled mixture is added dropwise and with vigorous stirring a solution of 21.6 g. of o-nitrobenzyl bromide in anhydrous toluene. The reaction mixture is stirred at room temperature for 2 hours and is then warmed on a steam bath for 6 hours. To the cooled mixture is added 300 ml. of water, the aqueous layer separated, dried, and concentrated to yield o-bromophenethyl o-nitrobenzyl ether.

(b) To a solution of 10 g. of the product from (a) in 200 ml. of ethanol is added 0.5 g. of 10% palladium on carbon catalyst and the mixture shaken with hydrogen at 50 p.s.i. until the theoretical quantity of hydrogen has reacted. The mixture is filtered, and concentrated to yield crude o-[o-bromophenethoxymethyl]aniline. The product is dissolved in anhydrous ether, treated with an ethereal solution of hydrogen chloride and the precipitated hydrochloride is filtered and recrystallized from an alcohol-ether mixture. An aqueous solution of the hydrochloride is treated with sodium bicarbonate and the liberated base extracted into ether. The ether solution is dried and concentrated to yield the o-[o-bromophenethoxymethyl]aniline.

(c) To a mixture of 85 g. of 98–100% formic acid is added, in small portions, with cooling and stirring, 55 g. of the product from (b). The reaction mixture is refluxed for 1 hour, concentrated to dryness, and the residue recrystallized from heptane to yield o-[o-bromophenethoxymethyl]formanilide.

(d) A stirred mixture of 5.0 g. of the product from (c), 2.8 g. of micronized anhydrous potassium carbonate, 0.5 g. of copper powder, and 50 ml. of dimethylformamide is heated under nitrogen in an oil bath maintained at 155–160° for 2 hours. The hot mixture is filtered, the filtrate is concentrated to dryness, and the residue triturated with water. The filtered and dried solid is recrystallized from hexane to yield 5,10,12,13-tetrahydrodibenz[c,f][1,5]oxazonine-5-carboxaldehyde.

(e) A solution of 10 g. of the product from (d) in 500 ml. of ethanol and 100 ml. of 10% aqueous sodium hydroxide is refluxed for one hour, cooled, neutralized with aqueous hydrochloric acid, and concentrated to dryness. The residue is triturated with water, dried, and recrystallized from hexane to yield the desired 5,10,12,13-tetrahydrodibenz[c,f][1,5]oxazonine.

(f) A solution of 4 g. of phosgene in 30 ml. of toluene is added dropwise, with vigorous stirring to a cooled solution of 4.5 g. of the product from (e) and 4.0 g. of triethylamine in 175 ml. of anhydrous toluene. After the addition is complete, the mixture is stirred for 2 hours at room temperature, and filtered. The filtrate is concentrated in vacuo and the residue dissolved in ether. The solution is filtered and concentrated to give 5,10,12,13-tetrahydrodibenz[c,f][1,5]oxazonine-5-carbonyl chloride.

(g) A mixture of 2.9 g. of the product from (f) and 50 ml. of a 3.2 N ethanolic ammonia solution is heated in a sealed tube at 125° for 30 hours. The contents of the cooled tube are concentrated and the residue suspended in 100 ml. of water. The solid is filtered, dried, and recrystallized from acetonitrile to yield 5,10,12,13-tetrahydrodibenz[c,f][1,5]oxazonine-5-carboxamide.

EXAMPLE 24

5,10,12,13-tetrahydrodibenz[c,f][1,5]thiazonine-5-carboxamide (a) A mixture of 132 g. of 2-bromophenethyl bromide, 38 g. of thiourea and 250 ml. of 95% ethanol is refluxed for 3 hours. A solution of 30 g. of sodium hydroxide in 300 ml. of water is added and the mixture is refluxed for 2 hours. The aqueous layer is separated, acidified and extracted with benzene. The benzene extract is combined with the original organic layer, and washed with water. The benzene solution is dried, the solvent removed, and the residue distilled in vacuo to yield the desired 2-bromophenethyl mercaptan.

(b) Following the procedure of Example 23 but substituting an equivalent amount of the 2-bromophenethyl mercaptan for the 2-bromophenethyl alcohol, there is obtained the desired 5,10,12,13-tetrahydrodibenz[c,f][1,5]thiazonine-5-carboxamide.

EXAMPLE 25

8-chloro-5,6,12,13-tetrahydrodibenz[b,f][1,5]oxazonine-5-carboxamide

Following the procedure of Example 21 but substituting an equivalent amount of ethyl 5-chlorosalicylate for the ethyl salicylate, there is obtained 8-chloro-5,6,12,13-tetrahydrodibenz[b,f][1,5]oxazonine-5-carboxamide.

EXAMPLE 26

9-dimethylsulfamoyl-5,6,12,13-tetrahydrodibenz[b,f][1,5]oxazonine-5-carboxamide

Following the procedure of Example 21 but substituting an equivalent amount of ethyl 4-dimethylsulfamoylsalicylate, there is obtained 9-dimethylsulfamoyl-5,6,12,13-tetrahydrodibenz[b,f][1,5]oxazonine-5-carboxamide

EXAMPLE 27

9-methylsulfonyl-5,6,12,13-tetrahydrodibenz[b,f][1,5]thiazonine-5-carboxamide

Following the procedure of Example 21 but substituting an equivalent amount of ethyl 4-methylsulfonyl-2-mercaptobenzoate for the ethyl salicylate, there is obtained the desired 9-methylsulfonyl-5,6,12,13-tetrahydrodibenz[b,f][1,5]thiazonine-5-carboxamide.

EXAMPLE 28

7-fluoro-5,10,12,13-tetrahydrodibenz[c,f][1,5]oxazonine-5-carboxamide

Following the procedure of Example 23 but substituting an equivalent amount of 4-fluoro-o-nitrobenzyl bromide (obtained by the bromination of 4-fluoro-o-nitrotoluene at 150°) for the o-nitrobenzyl bromide, there is obtained the desired 7-fluoro-5,10,12,13-tetrahydrodibenz[c,f][1,5]oxazonine-5-carboxamide.

EXAMPLE 29

7-fluoro-5,10,12,13-tetrahydrodibenz[c,f][1,5]thiazonine-5-carboxamide

Following the procedure of Example 23 but substituting an equivalent amount of 4-fluoro-o-nitrobenzyl bromide for the o-nitrobenzyl bromide and an equivalent amount of o-bromophenethyl mercaptan for the o-bromophenethyl alcohol, there is obtained the desired 7-fluoro-5,10,12,13-tetrahydrodibenz[c,f][1,5]thiazonine-5-carboxamide.

EXAMPLE 30

11,12-dihydro-6H-dibenz[b,f][1,4]oxazocine-12-carboxamide (a) Methyl o-toluate.—A solution of 450 g. of o-toluic acid in 3000 ml. of methanol is stirred at room temperature and 100 ml. of concentrated sulfuric acid is added dropwise in 0.25 hour. The solution is refluxed for 6 hours. After partial removal of methanol, the reaction mixture is poured into ice water, the oil which separates is extracted with 300–500 ml. of ether, the ether extracts are combined, dried, the ether is distilled, and the residue fractionated to give 440 g. of methyl o-toluate, B.P. about 69–72° (2 mm.), $n_D^{24}$ 1.5170.

(b) Methyl 2-chloromethylbenzoate.—A solution of 2.61 g. of benzoyl peroxide in 321 g. of the product from (a) is added simultaneously with 224 ml. of sulfuryl chloride during one hour to 350 ml. of refluxing anhydrous chloroform irradiated by a U.V. lamp. Following the addition, stirring and U.V. irradiation is continued while the temperature is maintained at 60–65°. The solvent and excess sulfuryl chloride are removed in vacuo to give 426 g. of product, $n_D^{24}$ 1.5388.

(c) Methyl α-(o-nitrophenoxy)-o-toluate.—A solution of 186 g. of the product from (b) in 450 ml. of dimethylformamide is added at room temperature to a stirred solution of 103 g. of sodium bromide and 161 g. of the sodium salt of o-nitrophenol in 1100 ml. of dimethylformamide. The mixture is heated at 85–90° for 3 hours, cooled to 15°, filtered, and the filtrate added to water to give 223 g. of product, M.P. 98–109°. The crude product is recrystallized from Skellysolve E to give 147 g. of pure product, M.P. about 109–111°.

(d) α-(o-Nitrophenoxy)-o-toluic acid.—A suspension of 144 g. of the product from (c) in 3600 ml. of 95 percent ethanol is refluxed for 10 minutes, a solution of 31 g. of sodium hydroxide in 750 ml. of water is added as rapidly as possible to the hot solution and refluxing is continued for an additional 10 minutes. A solution of 92 ml. of concentrated hydrochloric acid in 750 ml. of water is added rapidly, followed by the addition of 2100 ml. of water. The yield of product, M.P. about 196–198°, is 126 g.

(e) α-(o-Aminophenoxy)-o-toluic acid.—A solution of 27 g. of the product from (d) in 205 ml. of 0.5 N NaOH is stirred for 10 minutes under nitrogen with 2 g. of Raney Nickel catalyst. The solution is filtered, placed in a Parr reduction bottle, 10 g. of Raney Nickel catalyst is added, and the mixture is hydrogenated to give 22 g. of the product, M.P. about 178–179°.

(f) 6H-dibenz[b,f][1,4]oxazocin-11(12H)-one.—To a solution of 8 g. of the product from (e) in 750 ml. anhydrous ethyl acetate is added 7.2 g. of N,N'-dicyclohexylcarbodiimide in 50 ml. of ethyl acetate. The mixture is stirred for 24 hours to give the product, M.P. about 210–211°.

(g) 11,12-dihydro - 6H - dibenz[b,f][1,4]oxazocine.—To 4.8 g. of lithium aluminum hydride in 1200 ml. of ether is added 6.6 g. of the product from (f). The reaction mixture is then refluxed for one hour, cooled, and 10 ml. of water is added and followed by 20 ml. of 10 percent sodium hydroxide. The ether solution is dried, concentrated, and the residue recrystallized from 120 ml. of cyclohexane to give 5 g. of product, M.P. about 133–135°.

(h) 11,12 - dihydro-6H-dibenz[b,f][1,4]oxazocine-12-carbonyl chloride.—To a solution of 4.2 g. of the product from (g) and 4 g. of triethylamine in 125 ml. of anhydrous toluene is added a solution of 4 g. of phosgene in 25 ml. of toluene. The residue from the reaction mixture solidifies to give the product, M.P. about 113–114°.

(i) 11,12 - dihydro-6H-dibenz[b,f][1,4]oxazocine-12-carboxamide.—The product from (h), 3.5 g., and 50 ml. of 3.2 N ethanolic ammonia are treated at 95–100° for 18 hours, cooled, concentrated, and the residue triturated with water to give the product, M.P. about 151–153°.

EXAMPLE 31

11,12-dihydro-6H-dibenz[b,f][1,5]oxazocine-11-carboxamide (a) o-[(o-Nitrobenzyl)oxy]benzoic acid.—To a solution of 152 g. of methyl salicylate in 500 ml. of methanol is added a solution of 65 g. of 85 percent potassium hydroxide in 650 ml. of methanol. The mixture is stirred for one hour at room temperature and a solution of 216 g. of o-nitrobenzyl bromide in 200 ml. of methanol is added dropwise. Subsequent to the addition, the mixture is refluxed for two hours, cooled somewhat, and 56 g. of potassium hydroxide pellets are added. The mixture is refluxed for 0.5 hour and the methanol is distilled from the steam bath. The residue is cooled and treated with an excess of 20 percent hydrochloric acid to precipitate o-[(o-nitrobenzyl)oxy]benzoic acid. The yield is 255 g.

(b) o-[o - Aminobenzyl)oxy]benzoic acid.—Employing the procedure of Example 30(e), but substituting 27 g. of the product from (a) for the 8 g. of compound in that example, there is obtained 24 g. of o-[(o-aminobenzyl)oxy]benzoic acid.

(c) 6,11 - dihydro-12H-dibenz[b,f][1,5]oxazocine-12-one.—When 8 g. of the product from (b) is substituted for the compound in Example 30(f) and the procedure of that example is followed, there is obtained the desired 6,11-dihydro-12H-dibenz[b,f][1,4]oxazocine-12-one.

(d) 11,12-dihydro - 6H - dibenz[b,f][1,5]oxazocine.—Employing the procedure of Example 30(g) but substituting 6.6 g. of the product from (c) for the compound in that example, there is obtained 11,12-dihydro-6H-dibenz[b,f][1,5]oxazocine.

(e) 11,12 - dihydro-6H-dibenz[b,f][1,5]oxazocine-11-carbonyl chloride.—The procedure of Example 30(h), employing 4.2 g. of the product from (d) in place of the 4.2 g. of material in that example gives 11,12-dihydro-6H-dibenz[b,f][1,5]oxazocine-11-carbonyl chloride.

(f) 11,12 - dihydro-6H-dibenz[b,f][1,5]oxazocine-11-carboxamide.—The product from (e), 3.5 g., and 50 ml. of 3.4 N ethanolic ammonia, reacted as in Example 30(i), gives 11,12-dihydro - 6H - dibenz[b,f][1,5]oxazocine-11-carboxamide.

EXAMPLE 32

11,12-dihydro-6H-dibenzo[b,f][1,5]thiazocine-11-carboxamide (a) o - [o - nitrobenzyl)thio]benzoic acid.—By substituting 168 g. of methyl thiosalicylate for the methyl salicylate in Example 31(a), there is obtained o-[(o-nitrobenzyl)thio]benzoic acid.

When the procedures of Examples 31(b), 31(c), 31(d), 31(e), and 31(f) are employed, but in each instance an equivalent weight of the thia derivative, as exemplified in Example 32(a), is prepared and used in place of the corresponding oxa derivative, there is obtained finally 11,12-dihydro - 6H - dibenzo[b,f][1,5]thiazepine-11-carboxamide.

What is claimed is:

1. A compound of the formula

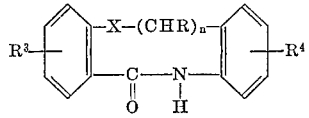

wherein $n$ is 2; X is oxygen; R is hydrogen, lower alkyl, phenyl, mono- or di-lower alkylphenyl, lower alkoxyphenyl or halophenyl; and $R^3$ and $R^4$ are each selected from the group consisting of hydrogen, halogen, lower alkyl, trifluoromethyl, cyano, lower alkoxy, lower alkylsulfonyl, amidosulfonyl, and N,N-di-lower alkylamidosulfonyl.

2. A compound in accordance with claim 1 having the name 6,11-dihydro - 12H - dibenz[b,f][1,5]oxazocine-12-one.

3. A compound of the formula

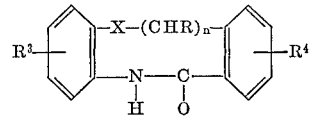

wherein $n$ is 1 or 2, X is oxygen or sulfur, provided that $n$ is 1 when X is sulfur, R is hydrogen, lower alkyl, phenyl, mono- or di-lower alkylphenyl, lower alkoxyphenyl or halophenyl; and $R^3$ and $R^4$ are each selected from the group consisting of hydrogen, halogen, lower alkyl, trifluoromethyl, lower alkoxy, lower alkylsulfonyl, amidosulfonyl, and N,N-di-lower alkylamidosulfonyl.

References Cited

UNITED STATES PATENTS 3,400,119  9/1968  Wenner et al. _____ 260—239.3

FOREIGN PATENTS 6,402,756  9/1964  Netherlands.

OTHER REFERENCES

Burger: "Medicinal Chemistry," 2nd edition, pp. 72–88 (Interscience) (1960).

JOHN D. RANDOLPH, Primary Examiner

R. T. BOND, Assistant Examiner

U.S. Cl. X.R.

260—999

PO-1050
(5/69)

UNITED STATES PATENT OFFICE
CERTIFICATE OF CORRECTION

Patent No. 3,539,555                    Dated November 10, 1970

Inventor(s) Harry L. Yale and Jack Bernstein

It is certified that error appears in the above-identified patent and that said Letters Patent are hereby corrected as shown below:

Column 1, line 51, "RR$^1$" should read--R$^1$--. Column 2, line 2, "alkanoyl-oxyalkyl" should read--alkanoyloxyalkyl--; same line "N-(2-" should read--N$^4$-(2--; and on line 13, "is or 1" should read--is 0 or 1--; and on line 22, "halophe-" should read-- haloph- --. Column 3, line 14, "aminophenozy" should read-- aminophenoxy--; and the arrow following the first formulas

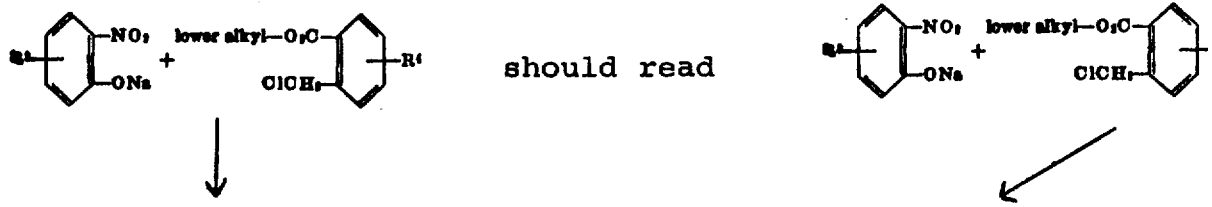

and that portion of formula (IV) reading

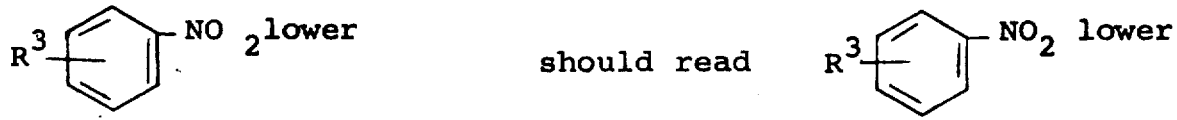

and that portion of formula (V) reading

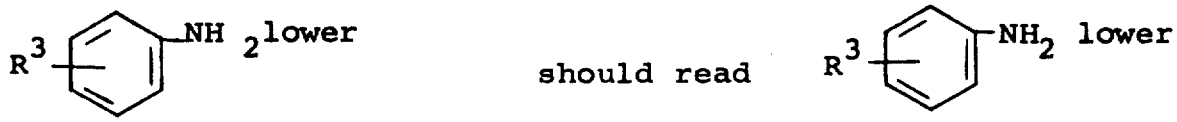

Column 5, the arrow following the second formulas

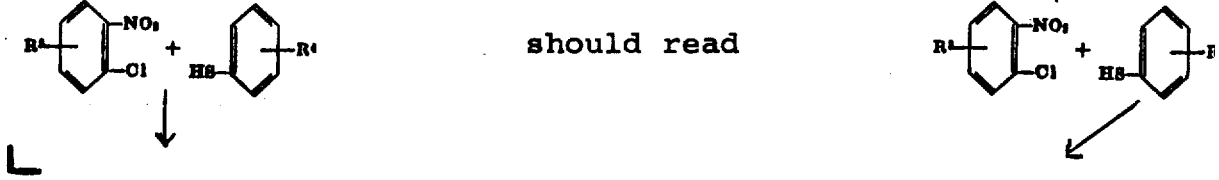

UNITED STATES PATENT OFFICE
CERTIFICATE OF CORRECTION

Patent No. 3,539,555     Dated November 10, 1970

Inventor(s)   Harry L. Yale and Jack Bernstein    PAGE - 2

It is certified that error appears in the above-identified patent and that said Letters Patent are hereby corrected as shown below:

Column 6, line 9, "(lower alkyl)-2-chloronitrobenzenes (e.g 5-methyl-2-" should read--(lower alkoxy)-o-chloronitrobenze such as 5-(lower --; and between lines 24 and 25 should be inserted--thiol, and 4-propoxybenzenethiol; and (trifluoro-methyl)benzene- --; and on line 36, "methoxypenol" should r --methoxyphenol--; and on the same line, "etoxy" should rea ethoxy--; and on line 53, "(penyl-" should read--(phenyl- - Column 7, line 60, "5-hexyl" should read--5-n-hexyl--; and line 67, "trifluoromethy)" should read--trifluoromethyl)--. Column 8, line 63, "-1-aminoben-" should read-- -2-aminoben Column 9, line 1, "derivate" should read--derivative--; and on line 70, "found" should read--formed--. Column 13, line "Example [4(c)" should read--Example 4(c)--. Column 22, fi formula, that portion reading

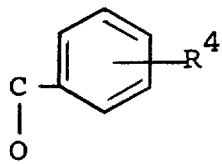   should read   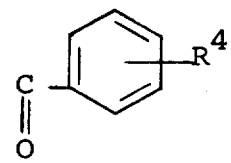

Signed and sealed this 11th day of May 1971.

(SEAL)
Attest:

EDWARD M. FLETCHER, JR.
Attesting Officer

WILLIAM E. SCHUYLER,
Commissioner of Pate